United States Patent
Mori (10) Patent No.: US 9,924,072 B2
(45) Date of Patent: Mar. 20, 2018

(54) IMAGE READING APPARATUS, IMAGE FORMING APPARATUS, AND NON-TRANSITORY COMPUTER READABLE MEDIUM

(71) Applicant: FUJI XEROX Co., Ltd., Tokyo (JP)

(72) Inventor: Kenji Mori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/008,996

(22) Filed: Jan. 28, 2016

(65) Prior Publication Data
US 2017/0006191 A1 Jan. 5, 2017

(30) Foreign Application Priority Data
Jul. 1, 2015 (JP) ................. 2015-132491

(51) Int. Cl.
*H04N 1/60* (2006.01)
*H04N 1/00* (2006.01)
*G03F 3/08* (2006.01)

(52) U.S. Cl.
CPC ....... *H04N 1/6008* (2013.01); *H04N 1/00013* (2013.01); *H04N 1/00037* (2013.01); *H04N 1/00087* (2013.01); *H04N 1/00477* (2013.01); *H04N 2201/0005* (2013.01); *H04N 2201/0081* (2013.01)

(58) Field of Classification Search
None
See application file for complete search history.

(56) References Cited

U.S. PATENT DOCUMENTS

| 5,946,420 A * | 8/1999 | Noh | H04N 1/40062 |
| | | | 358/462 |
| 6,037,584 A * | 3/2000 | Johnson | H04N 1/486 |
| | | | 250/234 |
| 7,865,095 B2 | 1/2011 | Kakutani | |
| 2002/0181028 A1* | 12/2002 | Chung | H04N 1/00236 |
| | | | 358/474 |
| 2006/0012837 A1* | 1/2006 | Ishikawa | H04N 1/0057 |
| | | | 358/474 |
| 2016/0254121 A1* | 9/2016 | Amir | G03F 9/7019 |
| | | | 250/492.22 |

FOREIGN PATENT DOCUMENTS

| JP | 11-112810 A | 4/1999 |
| JP | 2009-042375 A | 2/2009 |

* cited by examiner

*Primary Examiner* — Dov Popovici
(74) *Attorney, Agent, or Firm* — Sughrue Mion, PLLC (57) ABSTRACT

An image reading apparatus includes an image reading section and a detection section. The image reading section includes at least two detection units, and performs a reading operation on an image. The at least two detection units have respective spectral characteristics which are different from each other. The detection section detects a condition of an irregularity on an image carrier by comparing a detection result of the image read by the image reading section with an output characteristic. The output characteristic is stored in advance and is a color component obtained from a value obtained by the image reading section reading a test image having a region in at least one color.

16 Claims, 9 Drawing Sheets

IMAGE READING APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-132491 filed Jul. 1, 2015.

BACKGROUND

Technical Field

The present invention relates to an image reading apparatus, an image forming apparatus, and a non-transitory computer readable medium.

SUMMARY

According to an aspect of the invention, there is provided an image reading apparatus including an image reading section and a detection section. The image reading section includes at least two detection units, and performs a reading operation on an image. The at least two detection units have respective spectral characteristics which are different from each other. The detection section detects a condition of an irregularity on an image carrier by comparing a detection result of the image read by the image reading section with an output characteristic. The output characteristic is stored in advance and is a color component obtained from a value obtained by the image reading section reading a test image having a region in at least one color.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described in detail with reference to the drawings.

Figure 1:
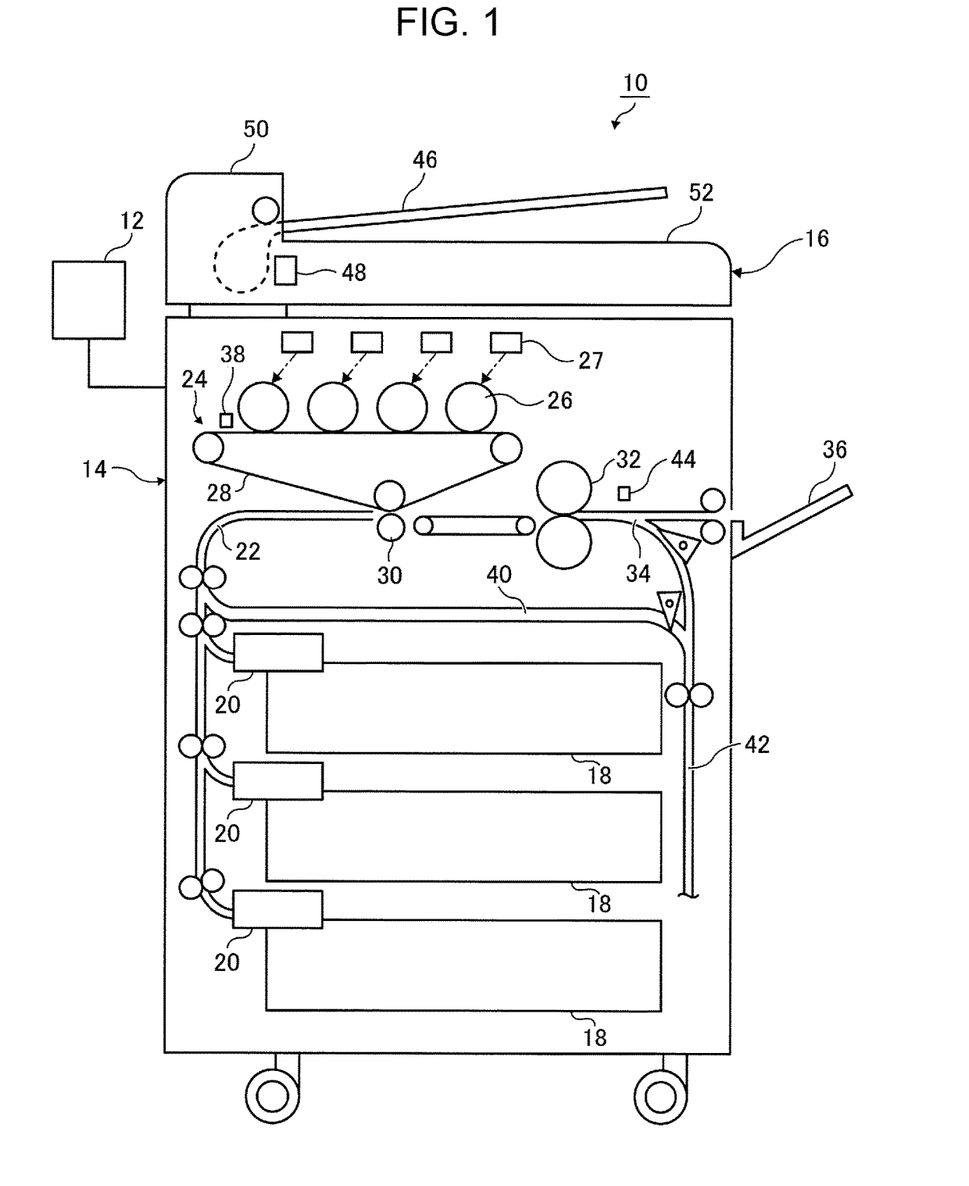
FIG. 1 is a schematic sectional view of an image forming apparatus according to an exemplary embodiment of the present invention.

FIG. 1 is a schematic sectional view of an image forming apparatus 10. The image forming apparatus 10 includes a user interface (UI) device 12, an image forming apparatus body 14, and an image reading apparatus 16.

The UI device 12 including a display for displaying information and an input receiving device for receiving input performed by an operator is constituted, for example, by a touch panel. An operator may input operation setting information via the UI device 12.

The image forming apparatus body 14 has, for example, three recording-medium supplying cassettes 18, each of which is provided with a supply head 20.

When one of the recording-medium supplying cassettes 18 is selected, a corresponding one of the supply heads 20 is activated, and a recording medium is supplied from the selected recording-medium supplying cassette 18 via a recording-medium supplying path 22 to an image forming unit 24.

The image forming unit 24 is provided with yellow, magenta, cyan, and black photoconductors 26 disposed side by side and an intermediate transfer belt 28.

Around each of the photoconductors 26, an exposure apparatus 27 is disposed. In addition, a charging device, a developing device, a first transfer device, a cleaning device, and the like (not illustrated) are disposed. A toner image formed by using each photoconductor 26 is transferred to the intermediate transfer belt 28. The exposure apparatus 27 is constituted, for example, by a light-emitting diode (LED) and a laser emitting device. The exposure apparatus 27 having, for example, an output resolution of 600 dpi has a configuration in which the amount of light may be adjusted for each dot.

The toner images on the intermediate transfer belt 28 are transferred by a second transfer roller 30 onto a recording medium which has been conveyed, and are fixed by a fixing device 32. The recording medium on which the toner images are fixed is discharged to a discharge unit 36 through a recording-medium discharge path 34. The image transferred onto the intermediate transfer belt 28 is read by a belt-image reading unit 38.

When a setting for duplex printing is set, the recording medium on which the toner image is fixed by the fixing device 32 is conveyed from the recording-medium discharge path 34 to a reversing device 40, and is reversed by the reversing device 40. Then, the recording medium is conveyed to a recording-medium reversing path 42, is conveyed back to the recording-medium supplying path 22 again, and is conveyed to the image forming unit 24, whereby printing is performed on the surface on the back. A fixed-image reading unit 44 is provided downstream of the fixing device 32. The fixed-image reading unit 44 reads the image fixed on the recording medium.

The image reading apparatus 16 includes a document supply unit 46 to which a document is supplied, a document-image reading unit 48 which reads the image of the document, a document feeding device 50 which feeds the document from the document supply unit 46 to the document-image reading unit 48, and a document discharge unit 52 which discharges the document from which the image has been read by the document-image reading unit 48.

Figure 2:
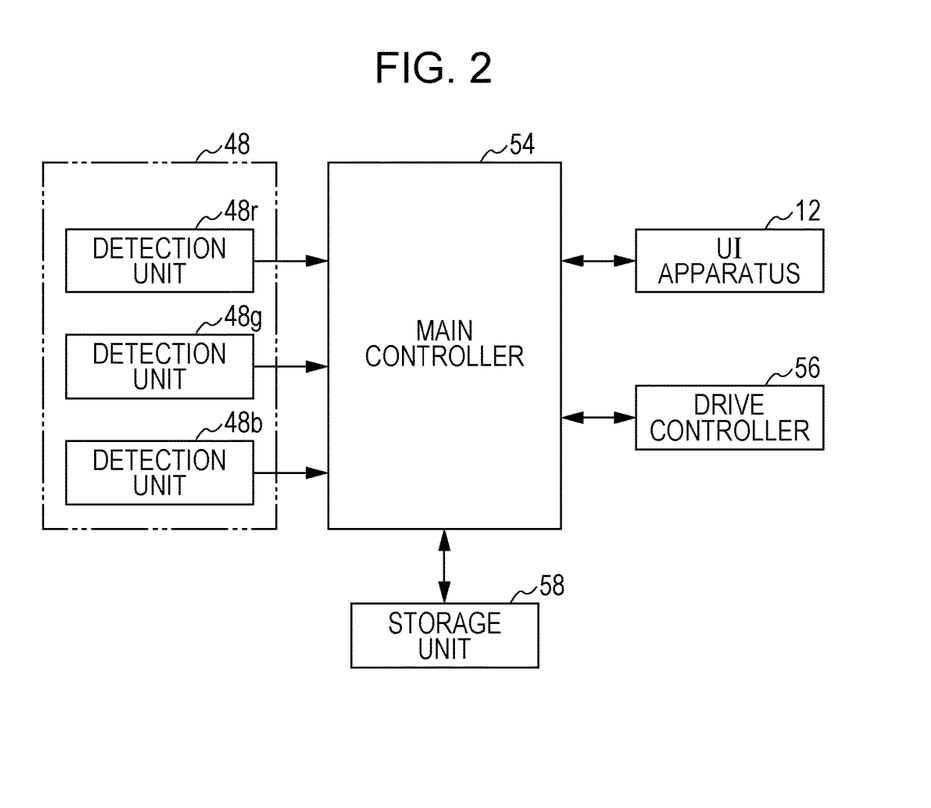
FIG. 2 is a block diagram illustrating the hardware configuration of the image forming apparatus according to the exemplary embodiment of the present invention.

FIG. 2 is a block diagram illustrating the hardware configuration of the image forming apparatus 10. The document-image reading unit 48 described above has, for example, three detection units 48*r*, 48*g*, and 48*b* each of which includes, for example, a charge-coupled device (CCD) or the like covered with a filter, and each of which has a different spectral characteristic from each other. That is, the first detection unit 48*r* reads red components; the second detection unit 48*g* reads green components; and the third detection unit 48*b* reads blue components. Each of these detection units 48*r*, 48*g*, and 48*b* detects a density as an analog signal, in the subscanning direction with respect to a document, for example, with a resolution of 600 dpi. Then, each of the detection units 48*r*, 48*g*, and 48*b* converts the analog signal into a digital signal through an analog-digital (A/D) converter, and outputs the data obtained through the conversion to a main controller 54.

The main controller 54 having a central processing unit (CPU) and the like controls the UI device 12 and a drive controller 56 on the basis of programs. The drive controller 56 controls drive of the image forming apparatus 10. A storage unit 58 stores data which is output from the main controller 54, and outputs stored data to the main controller 54 through access from the main controller 54.

Figure 3:
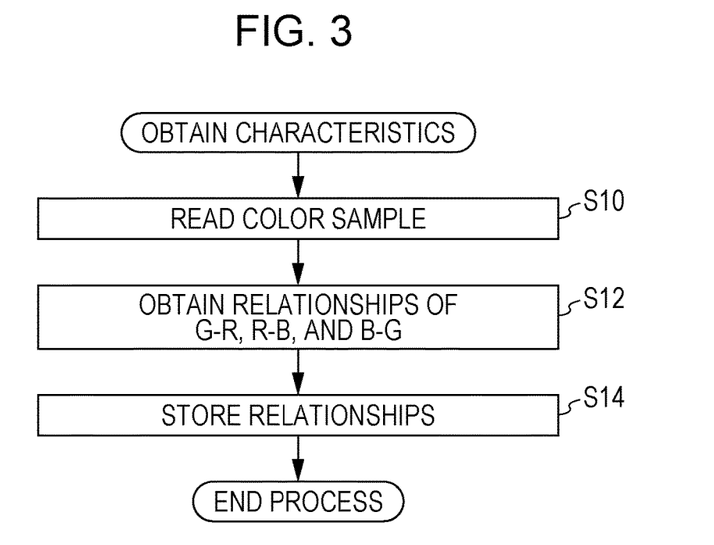
FIG. 3 is a flowchart for obtaining characteristics of detection units according to the exemplary embodiment of the present invention.
Figure 4:
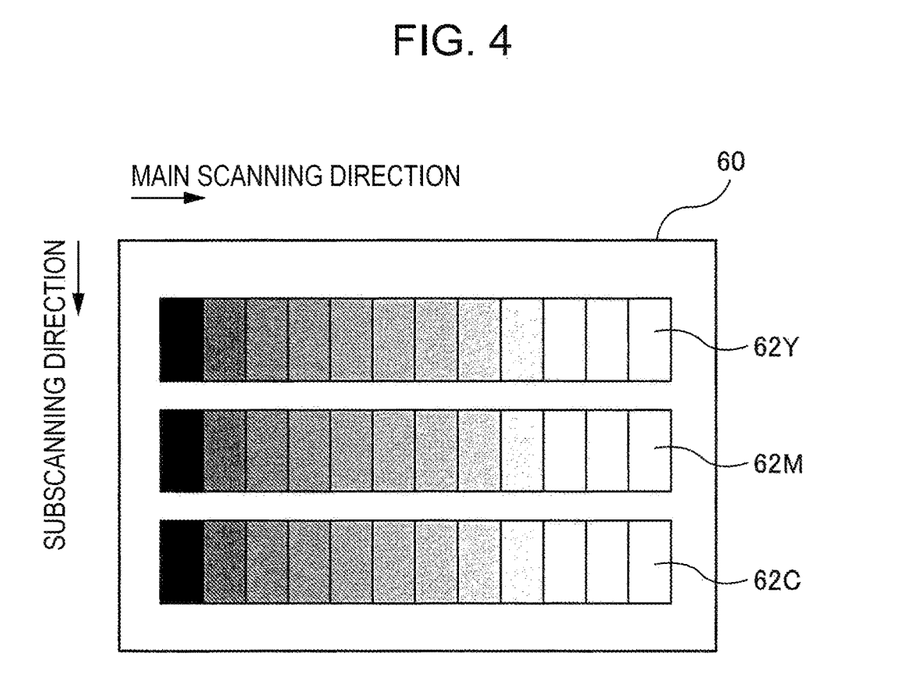
FIG. 4 is a plan view of an exemplary color sample used in the exemplary embodiment of the present invention.
Figure 5:
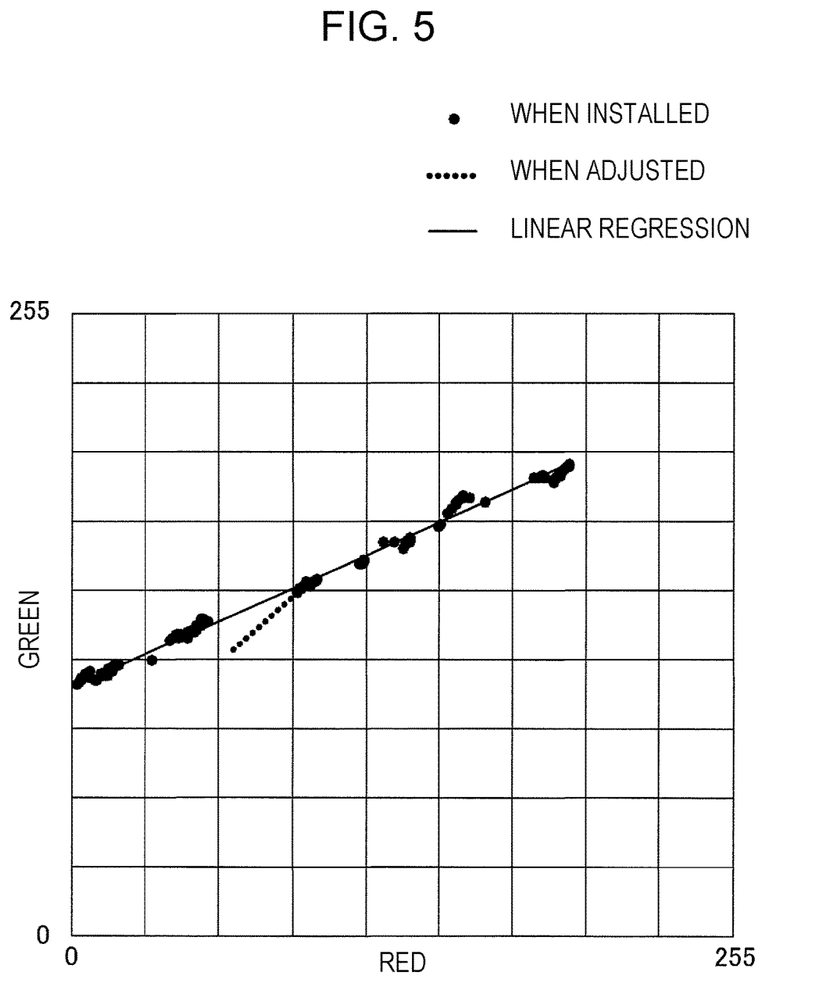
FIG. 5 is a diagram illustrating output characteristics obtained when the detection units used in the exemplary embodiment of the present invention are installed and when the detection units are to be adjusted.

The image forming apparatus 10 obtains output characteristics of the detection units 48*r*, 48*g*, and 48*b* of the document-image reading unit 48, for example, when the image forming apparatus 10 is installed. That is, as illustrated in FIG. 3, in step S10, the main controller 54 transmits an instruction to transmit, for example, a color sample 60 (color chart) illustrated in FIG. 4 to the document-image reading unit 48 so that the color sample 60 is read by using the detection units 48*r*, 48*g*, and 48*b*. The color sample 60 is formed in which, for example, a yellow row 62Y, a magenta row 62M, and a cyan row 62C are formed parallel with one another in the subscanning direction and in which each of the yellow row 62Y, the magenta row 62M, and the cyan row 62C extends in the main scanning direction so that its density is gradually changed in a predetermined rate. In the next step S12, relationships of G-R, R-B, and B-G are obtained on the basis of the detected values obtained through the reading in step S10. For example, as illustrated by using a solid line in FIG. 5, the values obtained by reading the cyan row 62C by using the detection unit 48*r* and the detection unit 48*g* are plotted so that the relationship between red output values and green output values is shown. The values thus plotted are subjected to linear regression so that the relationship is obtained. In the next step S14, each of the relationships of G-R, R-B, and B-G which are obtained by reading the yellow row 62Y, the magenta row 62M, and the cyan row 62C are stored in the storage unit 58 described above, and the process ends.

Figure 6:
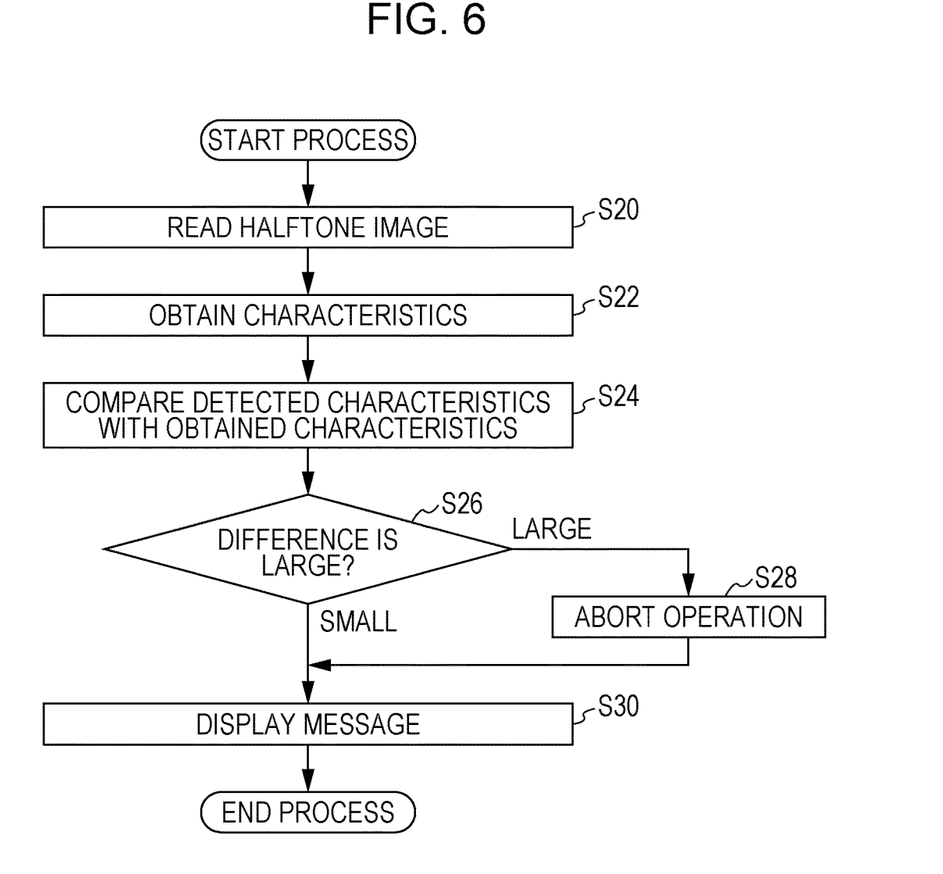
FIG. 6 is a flowchart for dealing with paper wrinkles, according to a first exemplary embodiment of the present invention.

FIG. 6 illustrates an operation flow for dealing with paper wrinkles, according to a first exemplary embodiment.

Figure 7:
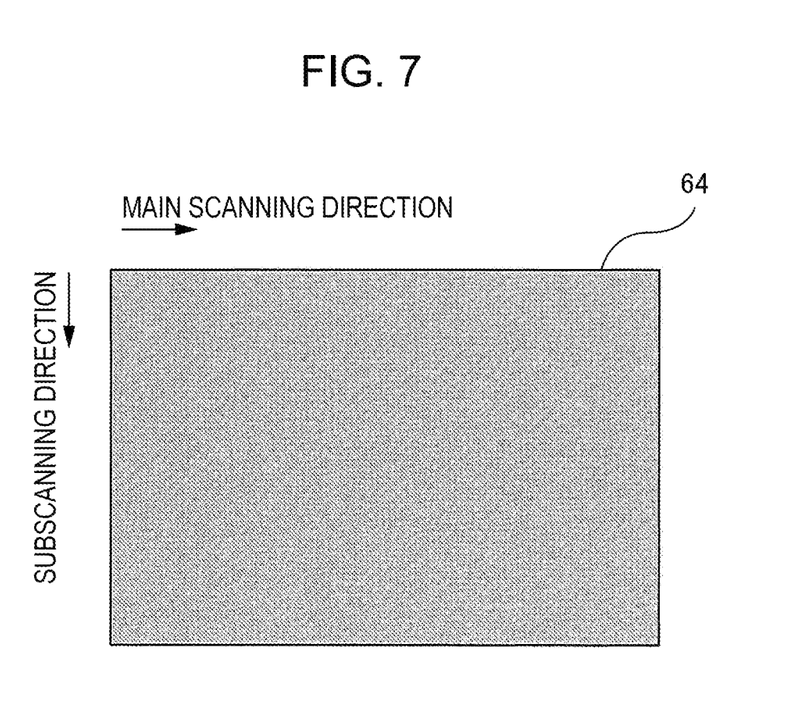
FIG. 7 is a plan view of testing paper on which a test image used in the first exemplary embodiment of the present invention is formed.

As illustrated in FIG. 7, in step S20, testing paper 64 on which a halftone image with a predetermined density is formed on the entire surface is prepared. The testing paper 64 is conveyed to the document-image reading unit 48, and the test image (the entire halftone image) on the testing paper 64 is read by using the detection units 48*r*, 48*g*, 48*b*. In the next step S22, relationships of G-R, R-B, and B-G are obtained on the basis of the detected values obtained through the reading in step S20. For example, if the test image is a cyan halftone image, as illustrated by using a dotted line in FIG. 5, the values obtained through reading using the detection unit 48*r* and the detection unit 48*g* are subjected, for example, to linear regression so that the relationship between red output values and green output values is obtained.

In the next step S24, the relationship characteristics of G-R, R-B, and B-G which are stored in the storage unit 58 are retrieved, and are compared with the relationship characteristics obtained in step S22. In theory, the relationship characteristics of G-R, R-B, and B-G which are stored in the storage unit 58 are to match the relationship characteristics obtained in step S22 in the density range of the halftone image.

However, when paper wrinkles are present on the testing paper, irregularities occur on the test image. The irregularities on the test image cause spectral characteristics of light reflected by the irregularities on the test image to be changed, and a difference between the relationship characteristics of G-R, R-B, and B-G which are stored in the storage unit 58 and the relationship characteristics obtained in step S22 arises.

Therefore, in step S26, it is determined whether or not the difference between the relationship characteristics is large. If the difference is large (such as if the number or ratio of pixels whose values are larger than a determined threshold is larger than a predetermined number or ratio, or if the difference between the averages over the halftone image is larger than a predetermined threshold), the process proceeds to step S28, and a control instruction is output to the drive controller 56 described above so that the operation performed by the document-image reading unit 48 is aborted. In the next step S30, if it is determined that the difference is small in step 26, a message such as "You may continue the operation." is displayed. If the operation performed by the document-image reading unit 48 is aborted in step S28, an instruction is transmitted to the UI device 12 so that a message such as "Read an image again." is displayed, and the process ends.

Figure 8:
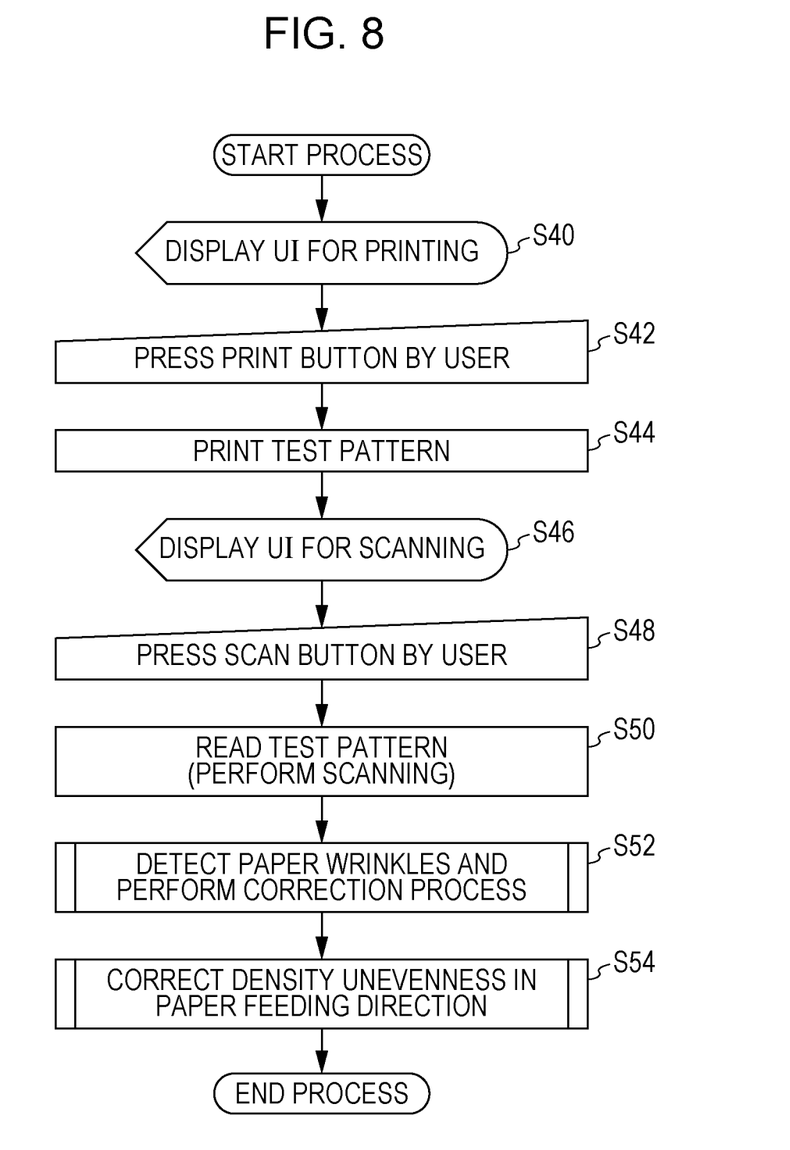
FIG. 8 is a flowchart for dealing with paper wrinkles, according to a second exemplary embodiment of the present invention.
Figure 9:
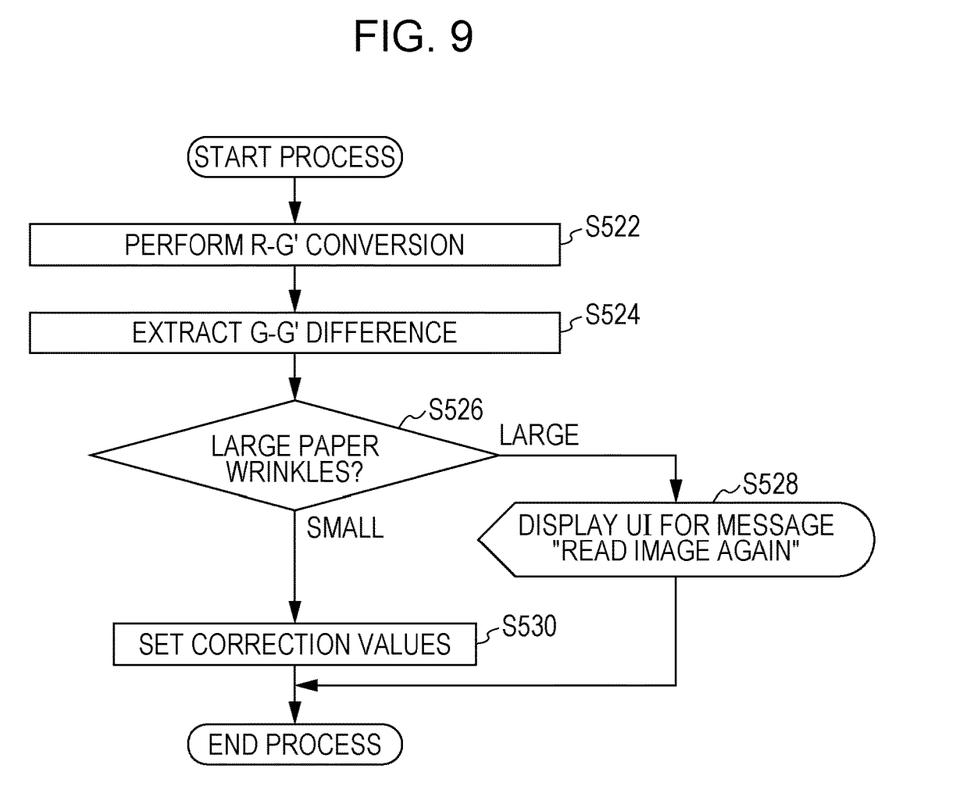
FIG. 9 is a flowchart describing the detail of step S52 in FIG. 8.

FIGS. 8 and 9 illustrate an operation flow for dealing with paper wrinkles, according to a second exemplary embodiment.

In step S40, an instruction to print a test image is displayed on the UI device 12. In the next step S42, a user presses a print switch of the UI device 12 in accordance with the instruction displayed in step S40. In the next step S44, a control instruction is output to the drive controller 56 so that the test image (test pattern) is printed. The test image is the halftone image used in the first exemplary embodiment. In the next step S46, an instruction to read the test image obtained through printing in step S44 is displayed on the UI device 12. In the next step 48, the user presses a reading button of the UI device 12 in accordance with the instruction displayed in step S46. In the next step S50, a control instruction is output to the drive controller 56 so that the test image is read. In the next step S52, paper wrinkles are detected and a correction process is performed. In the next step S54, density unevenness in the paper feeding direction (main scanning direction) is corrected, and the process ends.

Figure 10:
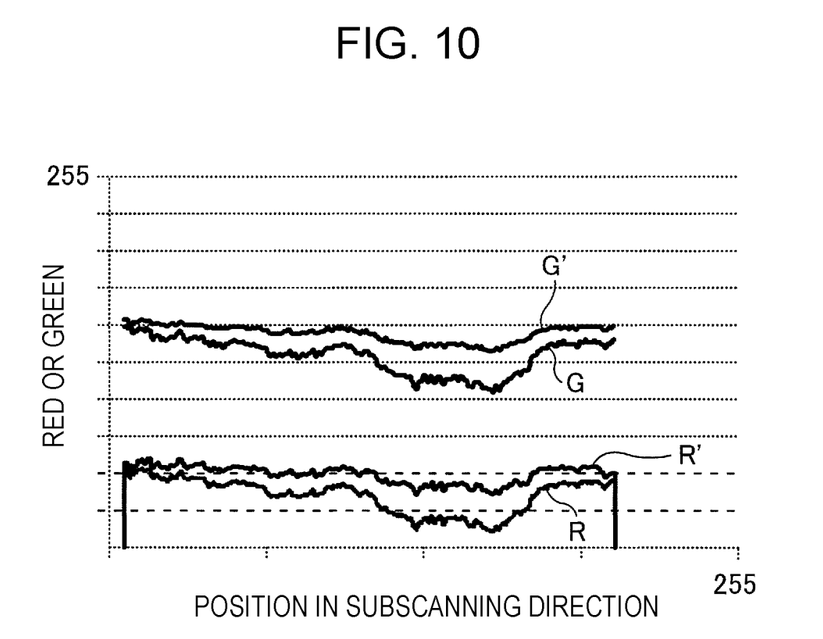
FIG. 10 is a diagram in which outputs obtained by reading a test image by using the detection units are compared with detected outputs, in the second exemplary embodiment of the present invention.

The process in step S52 will be described in detail. As illustrated in FIG. 9, in step S522, the R signal data for the testing paper 64 which is obtained through reading using the detection unit 48*r* is converted into G' data by using the linear regression data in FIG. 5. That is, in the case where the test image is a cyan halftone image, when R is data obtained by using the detection unit 48*r* performing a reading operation in the subscanning direction at a certain position in the main scanning direction, R is converted into G' on the basis of the R-G characteristics diagram stored in the storage unit 58 as illustrated in FIG. 10. If no paper wrinkles are present, G' is to match G data detected by the detection unit 48g.

However, when irregularities such as paper wrinkles are present on an image, a difference between the detected G data and the G' data obtained through conversion arises. That is, when irregularities are present on an image, hues and densities detected by the two detection units 48r and 48g are changed, and a difference between the detected G data and the G' data obtained through conversion arises. In step S524, the difference between the data G and the data G' is detected, and the condition of the irregularities on the test image is detected. This detection of the condition of the irregularities is performed in the entire subscanning and main scanning directions.

In the next step S526, it is determined whether or not large paper wrinkles are present, on the basis of the difference data G'-G obtained in step S524. The determination is made, for example, on the basis of whether or not the number of pixels having difference data G'-G which is equal to or larger than a predetermined threshold is equal to or larger than a predetermined number, or whether or not difference data G'-G which is equal to or larger than a predetermined threshold occupies an area whose ratio is equal to or larger than a predetermined ratio.

In step S526, if it is determined that large paper wrinkles are present, the process proceeds step S528, and the operation of the document-image reading unit 48 is aborted. Then, the UI device 12 is instructed to display a message such as "Read again.", and the process ends.

In step S526, if it is determined that large paper wrinkles are not present, the process proceeds to step S530, correction values for data G and R are set for each dot in the subscanning direction and the main scanning direction, and the process ends. That is, a correction value is set for data G on the basis of the difference data G'-G obtained in step S524. The data G'-G may be set as a correction value without conversion. Alternatively, for example, the data G'-G may be multiplied by a factor, for example, 0.8, and the resulting value may be set as a correction value. Instead, data obtained from another detection unit may be used to set a correction value. Similarly to data G, for data R, R'-R is obtained, and a correction value is set on the basis of the data R'-R.

In the above-described exemplary embodiments, the detection units 48r and 48g are used to read a cyan halftone image. A similar process is performed for yellow and magenta. That is, in the case of yellow, the determination for paper wrinkles is made on the basis of outputs from the detection units 48r and 48b or the detection units 48g and 48r; and in the case of magenta, on the basis of outputs from the detection units 48r and 48g or the detection units 48g and 48b.

Correction values for outputs from the detection units 48r, 48g, and 48b may be set by using, in a comprehensive manner, the data which is obtained by reading cyan, yellow, and magenta halftone images. A document may be read by the document-image reading unit 48 with less adverse effects from paper wrinkles by using the above-described correction values to correct outputs from the detection units 48r, 48g, and 48b. When a document is to be copied, outputs from the detection units 48r, 48g, and 48b are corrected by the main controller 54, and are converted into yellow/magenta/cyan/black (YMCK), whereby the amount of light emitted from the exposure apparatus 27 is changed.

Figure 11:
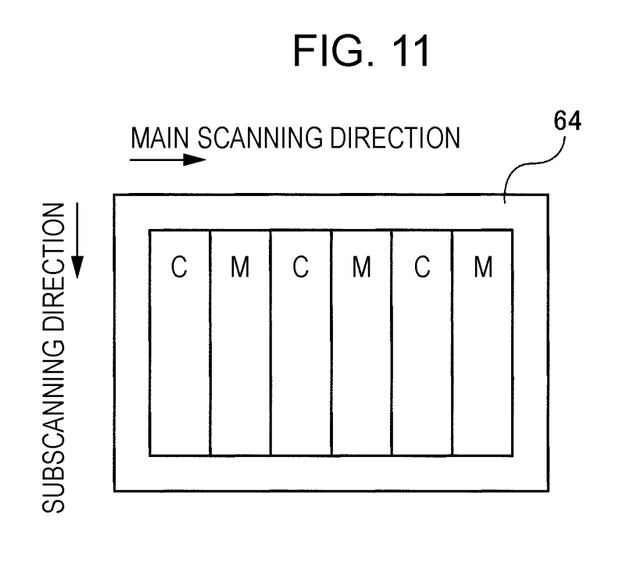
FIG. 11 is a plan view of testing paper on which a test image used in another exemplary embodiment of the present invention is formed.

In the above-described exemplary embodiments, a halftone image is formed on the entire surface of the testing paper 64 as a test image. However, the present invention is not limited to this. For example, as illustrated in FIG. 11, a test image in which a cyan pattern and a magenta pattern are alternately formed in the main scanning direction may be used. Alternatively, the condition of paper wrinkles may be determined by using one color, and the result may be used for the other colors. Instead, by using a white test image, variations (such as a standard deviation) of output values from the detection units 48r, 48g, and 48b may be measured, and the magnitude of the area for paper wrinkles may be determined.

In the above-described exemplary embodiments, application to the document-image reading unit 48 is described. However, the present invention is not limited to this. For example, the present invention may be applied to the belt-image reading unit 38, and floppiness of the intermediate transfer belt may be detected. Alternatively, the present invention may be applied to the fixed-image reading unit 44, and paper wrinkles on a recording medium holding a fixed image may be detected.

In the above-described exemplary embodiments, output values from the detection units 48r, 48g, and 48b are corrected in accordance with the condition of irregularities on a test image. When a document is to be copied, output values obtained in the image forming apparatus 10 may be corrected.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   an image reader that includes at least two detection units,
      wherein the image reader is configured to perform a reading operation on an image, and
      wherein the at least two detection units are each configured to detect different respective color components; and
   a processor configured to detect an irregularity on an image carrier by comparing a detected characteristic of the image with an output characteristic,
   wherein the processor is configured to correct an output value of at least one of the at least two detection units using a result obtained from detecting the irregularity on the image carrier by comparing the detected characteristic with the output characteristic,
   wherein the detected characteristic is a color relationship value between at least two color components obtained from the image reader performing the reading operation on the image, and
   wherein the output characteristic is stored in advance and is a color relationship value between at least two color components obtained from the image reader performing a reading operation on a test image.

2. The image reading apparatus according to claim 1, wherein:

the processor is further configured to abort the reading operation on the image using the result detected by the processor.

3. The image reading apparatus according to claim 1, wherein the image reader is further configured to perform the reading operation on the test image formed by using one color having a predetermined density.

4. The image reading apparatus according to claim 1, wherein the image reader is further configured to perform the reading operation on the test image formed by using a plurality of colors, each of the plurality of colors being predetermined.

5. The image reading apparatus according to claim 1, wherein the processor is further configured to correct another color using a correction value for at least one color.

6. The image reading apparatus according to claim 1, wherein the image reader is configured to perform a reading operation on an image transferred onto an image transfer belt.

7. The image reading apparatus according to claim 1, wherein the image reader is configured to perform a reading operation on a recording medium holding a fixed image.

8. The image reading apparatus according to claim 1, wherein the image reader is configured to perform a reading operation on an image of a document fed into the image reading apparatus.

9. The image reading apparatus according to claim 1, wherein the processor is further configured to, in response to a number of pixels of the detected characteristic being greater than a predetermined threshold, abort the reading operation on the image.

10. The image reading apparatus according to claim 1, wherein the processor is further configured to convert the output value of the at least one of the at least two detection units into at least one of yellow toner, magenta toner, cyan toner, and black toner by varying light emitted from a light source.

11. The image reading apparatus according to claim 1, wherein the output characteristic comprises a relationship between at least one of a green color component and a red color component, a red color component and a blue color component, and a blue color component and a green color component.

12. The image reading apparatus according to claim 1, wherein the detected characteristic comprises a relationship between at least one of a green color component and a red color component, a red color component and a blue color component, and a blue color component and a green color component.

13. The image reading apparatus according to claim 1, wherein the processor is further configured to, in response to a difference between the detected characteristic and the output characteristic being large, abort the reading operation on the image.

14. The image reading apparatus according to claim 13, wherein the difference is large when a number of pixels of the detected characteristic is greater than a predetermined threshold.

15. An image forming apparatus comprising:
an image forming unit comprising a photoconductor and an exposure apparatus, wherein the image forming unit is configured to form an image;
an image carrier configured to hold an image formed by the image forming unit;
an image reader that includes at least two detection units, wherein the image reader is configured to perform a reading operation on an image held by the image carrier, and
wherein the at least two detection units are each configured to detect different respective color components;
a processor configured to detect an irregularity on the image carrier by comparing a detected characteristic of the image obtained through the reading operation performed on the image with an output characteristic,
wherein the processor is configured to correct an output value of at least one of the at least two detection units using a result obtained from detecting the irregularity on the image carrier by comparing the detected characteristic with the output characteristic,
wherein the detected characteristic is a color relationship value between at least two color components obtained from the image reader performing the reading operation on the image, and
wherein the output characteristic is stored in advance and is a color relationship value between at least two color components obtained from the image reader performing a reading operation on a test image; and
a controller configured to control the image forming unit using the irregularity on the image carrier, the irregularity being detected by the processor.

16. A non-transitory computer readable medium storing a program causing a computer to execute a process comprising:
by using at least two detection units, performing a reading operation on an image,
wherein the at least two detection units are each configured to detect different respective color components;
detecting an irregularity on an image carrier by comparing a detected characteristic of the image with an output characteristic,
wherein the detected characteristic is a color relationship value between at least two color components obtained from the performing the reading operation on the image, and
wherein the output characteristic is stored in advance and is a color relationship value between at least two color components obtained from performing a reading operation on a test image; and
correcting an output value of at least one of the at least two detection units using a result obtained from the detecting the irregularity on the image carrier by comparing the detected characteristic with the output characteristic.

* * * * *